US010733642B2

(12) United States Patent
Benson et al.

(10) Patent No.: US 10,733,642 B2
(45) Date of Patent: Aug. 4, 2020

(54) SERVICE MANAGEMENT SYSTEM THAT ENABLES SUBSCRIBER-DRIVEN CHANGES TO SERVICE PLANS

(75) Inventors: Dan Benson, Bellevue, WA (US); Adrian Buzescu, Bellevue, WA (US); Ray Froelich, Issaquah, WA (US); Michael T. Hendrick, Renton, WA (US); Warren McNeel, Issaquah, WA (US); Karl Warfel, Covington, WA (US); Gary Sentman, Furlong, PA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 12/791,765

(22) Filed: Jun. 1, 2010
(Under 37 CFR 1.47)

(65) Prior Publication Data
US 2010/0241544 A1  Sep. 23, 2010

Related U.S. Application Data

(62) Division of application No. 11/449,383, filed on Jun. 7, 2006, now Pat. No. 8,255,281.

(51) Int. Cl.
*G06Q 30/00* (2012.01)
*G06Q 30/04* (2012.01)
(Continued)

(52) U.S. Cl.
CPC ......... *G06Q 30/04* (2013.01); *G06Q 20/0855* (2013.01); *G06Q 20/14* (2013.01)

(58) Field of Classification Search
CPC ..... G06Q 30/0601–0643; G06Q 30/04; G06Q 30/06; G06Q 30/08; G06Q 20/08–085514; G06Q 20/145
(Continued)

(56) References Cited

U.S. PATENT DOCUMENTS 4,723,209 A    2/1988  Hernandez et al.
D296,218 S    6/1988  Wells-Papanek et al.
(Continued)

FOREIGN PATENT DOCUMENTS

DE    10155431       6/2003
EP    0767418 A1    4/1997
(Continued)

OTHER PUBLICATIONS

"Alltel's free-wireless calling plan paying off". Virgil Larson. Knight Ridder Tribue Business Wire. May 5, 2006.*
(Continued)

*Primary Examiner* — William J Allen
(74) *Attorney, Agent, or Firm* — Knobbe, Martens, Olson & Bear, LLP

(57) ABSTRACT

A service management system that enables a subscriber of a mobile telecommunication system to modify aspects of his or her service plan and have the modification to the service plan take effect immediately. The subscriber enters a modification request to an aspect of a service plan. The modification request is verified against a set of rules that defines acceptable changes to the service plan. If the proposed modification to the service plan is a valid change, the change to the service plan is immediately propagated to a billing system and to other systems that implement the service plan. The subscriber is notified when the modification to the service plan is complete, and the subscriber is billed on a going-forward basis in accordance with the rate structure applicable to the plan.

31 Claims, 6 Drawing Sheets

(51) Int. Cl.
*G06Q 20/08* (2012.01)
*G06Q 20/14* (2012.01)

(58) Field of Classification Search
USPC .................................. 705/1.1, 26.1–27.2
See application file for complete search history.

(56) References Cited

U.S. PATENT DOCUMENTS

| | | |
|---|---|---|
| D298,144 S | 10/1988 | Wells-Papanek et al. |
| 5,590,256 A | 12/1996 | Tchao et al. |
| 5,617,539 A | 4/1997 | Ludwig et al. |
| D384,052 S | 9/1997 | Kodosky |
| D388,424 S | 12/1997 | DeMuro et al. |
| D391,948 S | 3/1998 | Eisenberg |
| 5,724,531 A | 3/1998 | Miyashita et al. |
| 5,751,980 A | 5/1998 | Musashi et al. |
| D395,427 S | 6/1998 | Arora et al. |
| 5,793,365 A | 8/1998 | Tang et al. |
| 5,796,394 A | 8/1998 | Wicks et al. |
| D397,687 S | 9/1998 | Arora et al. |
| D398,595 S | 9/1998 | Baer et al. |
| 5,822,123 A | 10/1998 | Davis et al. |
| 5,867,226 A | 2/1999 | Wehmeyer et al. |
| 5,880,733 A | 3/1999 | Horvitz et al. |
| 5,889,517 A | 3/1999 | Ueda et al. |
| D415,483 S | 10/1999 | Decker |
| 5,987,107 A | 11/1999 | Brown |
| 5,987,469 A | 11/1999 | Lewis et al. |
| 6,006,200 A | 12/1999 | Boies et al. |
| 6,023,275 A | 2/2000 | Horvitz et al. |
| 6,047,233 A | 4/2000 | Salvatore, Jr. et al. |
| D424,036 S | 5/2000 | Arora et al. |
| D424,541 S | 5/2000 | Mugura |
| 6,104,398 A | 8/2000 | Cox, Jr. et al. |
| 6,130,726 A | 10/2000 | Darbee et al. |
| 6,144,863 A | 11/2000 | Charron |
| 6,151,059 A | 11/2000 | Schein et al. |
| D437,858 S | 2/2001 | Yasui et al. |
| 6,188,406 B1 | 2/2001 | Fong et al. |
| D438,873 S | 3/2001 | Wang et al. |
| 6,201,957 B1 | 3/2001 | Son et al. |
| D440,979 S | 4/2001 | Wang et al. |
| 6,222,921 B1 | 4/2001 | Mugura et al. |
| 6,226,367 B1 | 5/2001 | Smith et al. |
| 6,236,398 B1 | 5/2001 | Kojima et al. |
| 6,249,863 B1 | 6/2001 | Redford et al. |
| D445,426 S | 7/2001 | Wang et al. |
| D446,790 S | 8/2001 | Wang et al. |
| 6,313,877 B1 | 11/2001 | Anderson |
| 6,332,024 B1 | 12/2001 | Inoue et al. |
| D454,138 S | 3/2002 | Imamura et al. |
| D454,139 S | 3/2002 | Feldcamp |
| 6,359,635 B1 | 3/2002 | Perttunen |
| 6,393,430 B1 | 5/2002 | Van Ryzin |
| D459,361 S | 6/2002 | Inagaki |
| D463,444 S | 9/2002 | Istvan et al. |
| 6,460,181 B1 | 10/2002 | Donnelly |
| 6,486,870 B1 | 11/2002 | Kozu |
| D467,252 S | 12/2002 | Lee |
| D469,442 S | 1/2003 | Bohlen, Jr. et al. |
| D470,857 S | 2/2003 | Anderson et al. |
| D471,226 S | 3/2003 | Gray |
| 6,532,459 B1 | 3/2003 | Berson |
| 6,538,635 B1 | 3/2003 | Ringot |
| D472,902 S | 4/2003 | Nashida et al. |
| D473,236 S | 4/2003 | Robbin et al. |
| D474,198 S | 5/2003 | Barnes |
| D474,778 S | 5/2003 | Barnes |
| D475,064 S | 5/2003 | Nashida et al. |
| 6,563,515 B1 | 5/2003 | Reynolds et al. |
| 6,577,330 B1 | 6/2003 | Tsuda et al. |
| 6,600,936 B1 | 7/2003 | Karkkainen et al. |
| D478,912 S | 8/2003 | Johnson |
| D485,279 S | 1/2004 | DeCombe |
| 6,678,891 B1 | 1/2004 | Wilcox et al. |
| D486,499 S | 2/2004 | Hayashi et al. |
| 6,741,268 B1 | 5/2004 | Hayakawa |
| 6,757,365 B1 | 6/2004 | Bogard |
| D495,339 S | 8/2004 | Gildred |
| 6,775,659 B2 | 8/2004 | Clifton-Bligh |
| 6,781,575 B1 | 8/2004 | Hawkins et al. |
| D495,715 S | 9/2004 | Gildred |
| 6,788,987 B2 | 9/2004 | Slechta et al. |
| 6,801,849 B2 | 10/2004 | Szukala et al. |
| 6,845,153 B2 | 1/2005 | Tiburtius et al. |
| 6,850,255 B2 | 2/2005 | Muschetto |
| 6,865,404 B1 | 3/2005 | Tikkala et al. |
| D506,474 S | 6/2005 | Gildred |
| 6,907,575 B2 | 6/2005 | Duarte |
| D507,577 S | 7/2005 | Totten et al. |
| 6,925,650 B1 | 8/2005 | Arsenault et al. |
| D510,581 S | 10/2005 | Robbin et al. |
| 6,959,207 B2 | 10/2005 | Keinonen et al. |
| 6,968,179 B1 | 11/2005 | De Vries |
| 6,975,712 B1 | 12/2005 | Schnarel et al. |
| 6,978,473 B1 | 12/2005 | Nsonwu et al. |
| 7,007,239 B1 | 2/2006 | Hawkins et al. |
| 7,036,091 B1 | 4/2006 | Nguyen et al. |
| 7,046,993 B2 | 5/2006 | Haaramo et al. |
| D523,439 S | 6/2006 | Kuroda |
| D523,440 S | 6/2006 | Hernandez et al. |
| D523,868 S | 6/2006 | Kuroda |
| 7,076,546 B1 | 7/2006 | Bates et al. |
| 7,083,109 B2 | 8/2006 | Pouchak |
| 7,086,008 B2 | 8/2006 | Capps et al. |
| 7,089,287 B2 | 8/2006 | Bellotti et al. |
| 7,099,862 B2 | 8/2006 | Fitzpatrick et al. |
| D528,556 S | 9/2006 | Decombe |
| 7,111,788 B2 | 9/2006 | Reponen |
| 7,117,445 B2 | 10/2006 | Berger |
| 7,137,073 B2 | 11/2006 | Kim et al. |
| 7,174,516 B2 | 2/2007 | Chipchase |
| 7,178,109 B2 | 2/2007 | Hewson et al. |
| 7,187,761 B2 | 3/2007 | Bookstaff |
| D540,340 S | 4/2007 | Cummins |
| D543,986 S | 6/2007 | Rimas-Ribikauskas et al. |
| D543,987 S | 6/2007 | Rimas-Ribikauskas et al. |
| D543,992 S | 6/2007 | Vigesaa |
| D544,875 S | 6/2007 | Wang et al. |
| D544,877 S | 6/2007 | Sasser |
| D545,324 S | 6/2007 | Decombe |
| 7,231,229 B1 | 6/2007 | Hawkins et al. |
| 7,236,576 B2 | 6/2007 | Schnarel et al. |
| 7,236,780 B2 | 6/2007 | Benco et al. |
| D545,827 S | 7/2007 | Evans et al. |
| D545,832 S | 7/2007 | Armendariz |
| D546,342 S | 7/2007 | Armendariz |
| D547,321 S | 7/2007 | Viegers et al. |
| 7,248,677 B2 | 7/2007 | Randall et al. |
| 7,248,857 B1 | 7/2007 | Richardson et al. |
| D548,239 S | 8/2007 | Rimas-Ribikauskas et al. |
| D548,743 S | 8/2007 | Takahashi et al. |
| D550,681 S | 9/2007 | Totten et al. |
| D551,252 S | 9/2007 | Andre et al. |
| D552,114 S | 10/2007 | Tolle et al. |
| D554,142 S | 10/2007 | Cameron |
| 7,280,652 B2 | 10/2007 | Bocking et al. |
| D554,652 S | 11/2007 | Shen et al. |
| D556,765 S | 12/2007 | Evans et al. |
| D557,268 S | 12/2007 | Fletcher |
| D558,221 S | 12/2007 | Nagata et al. |
| D562,343 S | 2/2008 | Fletcher |
| 7,330,845 B2 | 2/2008 | Lee et al. |
| D563,972 S | 3/2008 | Sherry |
| 7,343,365 B2 | 3/2008 | Farnham et al. |
| 7,343,565 B2 | 3/2008 | Ying et al. |
| D565,586 S | 4/2008 | Shin et al. |
| D565,627 S | 4/2008 | Kase |
| D567,251 S | 4/2008 | Sadler |
| D567,817 S | 4/2008 | Kwag et al. |
| 7,353,034 B2 | 4/2008 | Haney |
| 7,360,174 B2 | 4/2008 | Grossman et al. |
| D568,334 S | 5/2008 | Okaro et al. |
| D568,897 S | 5/2008 | Byeon |

(56) References Cited

U.S. PATENT DOCUMENTS

| | | |
|---|---|---|
| D568,898 S | 5/2008 | Byeon |
| D568,899 S | 5/2008 | Byeon |
| D569,387 S | 5/2008 | Byeon |
| 7,369,850 B2 | 5/2008 | Andrew et al. |
| D570,369 S | 6/2008 | Fletcher |
| D571,819 S | 6/2008 | Scott et al. |
| D573,601 S | 7/2008 | Gregov et al. |
| D574,392 S | 8/2008 | Kwag et al. |
| D575,297 S | 8/2008 | Glezer et al. |
| D575,298 S | 8/2008 | Chen et al. |
| D575,792 S | 8/2008 | Benson |
| D576,174 S | 9/2008 | Ording et al. |
| D577,364 S | 9/2008 | Flynt et al. |
| D578,134 S | 10/2008 | Jasinski |
| D578,543 S | 10/2008 | Ulm et al. |
| 7,437,005 B2 | 10/2008 | Drucker et al. |
| 7,440,910 B1 | 10/2008 | Ruvolo et al. |
| 7,444,342 B1 | 10/2008 | Hall et al. |
| D580,450 S | 11/2008 | Chen et al. |
| D580,946 S | 11/2008 | Chen et al. |
| 7,450,927 B1 | 11/2008 | Creswell et al. |
| D582,426 S | 12/2008 | Chen et al. |
| D582,928 S | 12/2008 | Blankenship et al. |
| D583,823 S | 12/2008 | Chen et al. |
| D584,737 S | 1/2009 | Stone et al. |
| D585,453 S | 1/2009 | Chen et al. |
| D585,454 S | 1/2009 | Ismail |
| D586,361 S | 2/2009 | Horowitz et al. |
| D586,362 S | 2/2009 | Horowitz et al. |
| 7,490,295 B2 | 2/2009 | Chaudhri et al. |
| D588,148 S | 3/2009 | Stone et al. |
| D588,149 S | 3/2009 | Brownell et al. |
| D588,150 S | 3/2009 | Stone et al. |
| 7,503,014 B2 | 3/2009 | Tojo et al. |
| 7,506,246 B2 | 3/2009 | Hollander |
| 7,512,652 B1 | 3/2009 | Appelman et al. |
| D589,970 S | 4/2009 | Bhat et al. |
| D590,407 S | 4/2009 | Watanabe et al. |
| D590,412 S | 4/2009 | Saft et al. |
| 7,519,912 B2 | 4/2009 | Moody et al. |
| 7,526,306 B2 | 4/2009 | Brems et al. |
| D592,218 S | 5/2009 | Blankenship et al. |
| D592,674 S | 5/2009 | Kwag |
| D593,120 S | 5/2009 | Bouchard et al. |
| 7,536,654 B2 | 5/2009 | Anthony et al. |
| D593,574 S | 6/2009 | Guimaraes et al. |
| D593,576 S | 6/2009 | Ball et al. |
| D594,015 S | 6/2009 | Singh et al. |
| D594,465 S | 6/2009 | Hong et al. |
| D594,872 S | 6/2009 | Akimoto |
| 7,543,245 B2 | 6/2009 | Irimajiri |
| 7,546,543 B2 | 6/2009 | Louch et al. |
| 7,555,727 B2 | 6/2009 | Hawkins et al. |
| D596,192 S | 7/2009 | Shotel |
| 7,562,304 B2 | 7/2009 | Dixon et al. |
| 7,577,700 B2 | 8/2009 | Tolson et al. |
| 7,580,363 B2 | 8/2009 | Sorvari et al. |
| D599,368 S | 9/2009 | Kanga et al. |
| D599,806 S | 9/2009 | Brown et al. |
| D599,807 S | 9/2009 | Marashi |
| D599,810 S | 9/2009 | Scalisi et al. |
| D599,811 S | 9/2009 | Watanabe et al. |
| D599,812 S | 9/2009 | Hirsch |
| D599,813 S | 9/2009 | Hirsch |
| D599,814 S | 9/2009 | Ogura et al. |
| D601,153 S | 9/2009 | Setiawan et al. |
| 7,587,215 B2 | 9/2009 | Chakraborty et al. |
| 7,587,683 B2 | 9/2009 | Ito et al. |
| D602,038 S | 10/2009 | Channell et al. |
| 7,603,628 B2 | 10/2009 | Park et al. |
| D603,415 S | 11/2009 | Lin et al. |
| D603,416 S | 11/2009 | Poling et al. |
| D603,418 S | 11/2009 | Magnani et al. |
| D603,420 S | 11/2009 | Channell |
| D603,867 S | 11/2009 | La et al. |
| D604,310 S | 11/2009 | Ahn |
| D604,316 S | 11/2009 | Hoefnagels et al. |
| D604,317 S | 11/2009 | Hoefnagels et al. |
| D604,740 S | 11/2009 | Matheny et al. |
| 7,620,996 B2 | 11/2009 | Torres et al. |
| D605,200 S | 12/2009 | Sakai |
| D605,652 S | 12/2009 | Plaisted et al. |
| D605,653 S | 12/2009 | Danton |
| D606,088 S | 12/2009 | Yokouchi et al. |
| D606,550 S | 12/2009 | La et al. |
| D607,002 S | 12/2009 | Jonasson et al. |
| 7,636,889 B2 | 12/2009 | Weber et al. |
| D608,364 S | 1/2010 | Walsh et al. |
| D608,366 S | 1/2010 | Matas |
| D608,367 S | 1/2010 | Scalisi et al. |
| D608,368 S | 1/2010 | Bamford |
| 7,646,745 B2 | 1/2010 | Caldwell et al. |
| 7,650,361 B1 | 1/2010 | Wong et al. |
| D609,714 S | 2/2010 | Oda et al. |
| D609,715 S | 2/2010 | Chaudhri |
| D610,159 S | 2/2010 | Matheny et al. |
| D610,161 S | 2/2010 | Matas |
| 7,665,028 B2 | 2/2010 | Cummins et al. |
| 7,665,033 B2 | 2/2010 | Byrne et al. |
| D611,056 S | 3/2010 | Langlois et al. |
| D611,484 S | 3/2010 | Mays et al. |
| D611,485 S | 3/2010 | Marashi |
| D611,489 S | 3/2010 | Bell et al. |
| D611,490 S | 3/2010 | Lee et al. |
| D612,394 S | 3/2010 | La et al. |
| D612,860 S | 3/2010 | Tarara et al. |
| 7,673,017 B2 | 3/2010 | Kim et al. |
| 7,685,520 B2 | 3/2010 | Rashkovskiy et al. |
| 7,685,530 B2 | 3/2010 | Sherrard et al. |
| D613,300 S | 4/2010 | Chaudhri |
| D613,747 S | 4/2010 | Jonasson et al. |
| D614,191 S | 4/2010 | Takano et al. |
| D614,192 S | 4/2010 | Takano et al. |
| D614,633 S | 4/2010 | Watanabe et al. |
| D614,643 S | 4/2010 | Viegers et al. |
| D614,646 S | 4/2010 | Chen et al. |
| 7,702,543 B2 | 4/2010 | MacKay et al. |
| 7,703,031 B2 | 4/2010 | Nakagawa et al. |
| 7,705,833 B2 | 4/2010 | Kim |
| D615,090 S | 5/2010 | Sogabe |
| D615,546 S | 5/2010 | Lundy et al. |
| D615,549 S | 5/2010 | Caine et al. |
| 7,720,498 B2 | 5/2010 | Lee |
| D617,804 S | 6/2010 | Hirsch |
| D617,805 S | 6/2010 | Scalisi et al. |
| D618,250 S | 6/2010 | Stallings et al. |
| 7,735,021 B2 | 6/2010 | Padawer et al. |
| 7,738,912 B1 | 6/2010 | Hawkins et al. |
| D619,593 S | 7/2010 | Fujioka et al. |
| D619,594 S | 7/2010 | Jonasson et al. |
| D620,948 S | 8/2010 | Scalisi et al. |
| D621,844 S | 8/2010 | Van Os |
| D621,845 S | 8/2010 | Anzures et al. |
| D622,280 S | 8/2010 | Tarara |
| 7,779,358 B1 | 8/2010 | Gupta et al. |
| D624,556 S | 9/2010 | Chaudhri |
| 7,797,641 B2 | 9/2010 | Karukka et al. |
| D625,325 S | 10/2010 | Vu et al. |
| D626,136 S | 10/2010 | Fujimura |
| D627,790 S | 11/2010 | Chaudhri |
| D628,206 S | 11/2010 | Lemay |
| 7,831,675 B2 | 11/2010 | Narayanaswami et al. |
| 7,898,600 B2 | 3/2011 | Lee et al. |
| 7,900,139 B2 | 3/2011 | Hosotsubo |
| D638,025 S | 5/2011 | Saft et al. |
| 7,971,222 B2 | 6/2011 | Ellis |
| 8,015,187 B2 | 9/2011 | Choi et al. |
| 8,032,470 B1 | 10/2011 | Heidenreich et al. |
| 8,046,801 B2 | 10/2011 | Ellis et al. |
| D652,843 S | 1/2012 | Van Os |
| 8,631,351 B2 | 1/2014 | Fong et al. |
| 8,671,355 B2 | 3/2014 | Pegg et al. |
| 8,893,025 B2 | 11/2014 | Vance et al. |
| 9,160,828 B2 | 10/2015 | Vance et al. |

(56) References Cited

U.S. PATENT DOCUMENTS

| | | |
|---|---|---|
| 9,195,966 B2 | 11/2015 | Vance et al. |
| 9,210,247 B2 | 12/2015 | Vance et al. |
| 9,304,659 B2 | 4/2016 | Sherrard et al. |
| 9,355,382 B2 | 5/2016 | Vance et al. |
| 9,363,378 B1 | 6/2016 | McDaniel |
| 9,396,542 B2 | 6/2016 | Vance et al. |
| 9,886,487 B2 | 2/2018 | Vance et al. |
| 10,021,231 B2 | 7/2018 | Vance et al. |
| 10,177,990 B2 | 1/2019 | Vance et al. |
| 10,178,519 B2 | 1/2019 | Vance et al. |
| 10,191,623 B2 | 1/2019 | Vance et al. |
| 10,510,008 B2 | 12/2019 | Vance et al. |
| 2001/0044743 A1 | 11/2001 | McKinley et al. |
| 2001/0046886 A1 | 11/2001 | Ishigaki |
| 2002/0045960 A1 | 4/2002 | Phillips et al. |
| 2002/0052754 A1* | 5/2002 | Joyce et al. ............... 705/1 |
| 2002/0054164 A1 | 5/2002 | Uemura |
| 2002/0059201 A1 | 5/2002 | Work |
| 2002/0145623 A1 | 10/2002 | Decombe |
| 2003/0014179 A1 | 1/2003 | Szukala et al. |
| 2003/0030670 A1 | 2/2003 | Duarte et al. |
| 2003/0034878 A1 | 2/2003 | Hull et al. |
| 2003/0078033 A1 | 4/2003 | Sauer et al. |
| 2003/0164818 A1 | 9/2003 | Miller-Smith et al. |
| 2003/0210265 A1 | 11/2003 | Haimberg |
| 2003/0224816 A1 | 12/2003 | Kundaje et al. |
| 2003/0225879 A1 | 12/2003 | Chipchase |
| 2004/0017376 A1 | 1/2004 | Tagliabue et al. |
| 2004/0041836 A1 | 3/2004 | Zaner et al. |
| 2004/0046796 A1 | 3/2004 | Fujita |
| 2004/0067751 A1 | 4/2004 | Vandermeijden et al. |
| 2004/0075691 A1 | 4/2004 | Moon |
| 2004/0077340 A1 | 4/2004 | Forsyth |
| 2004/0091093 A1* | 5/2004 | Bookstaff ............... 379/201.01 |
| 2004/0100479 A1 | 5/2004 | Nakano et al. |
| 2004/0102225 A1 | 5/2004 | Furuta et al. |
| 2004/0113927 A1 | 6/2004 | Quinn et al. |
| 2004/0119755 A1 | 6/2004 | Guibourge |
| 2004/0119758 A1 | 6/2004 | Grossman et al. |
| 2004/0122683 A1 | 6/2004 | Grossman et al. |
| 2004/0122684 A1 | 6/2004 | Kaikuranta |
| 2004/0133638 A1 | 7/2004 | Doss et al. |
| 2004/0155908 A1 | 8/2004 | Wagner |
| 2004/0162812 A1 | 8/2004 | Lane |
| 2004/0172455 A1 | 9/2004 | Green et al. |
| 2004/0185890 A1 | 9/2004 | Drozt et al. |
| 2004/0221239 A1 | 11/2004 | Hachigian et al. |
| 2004/0235520 A1 | 11/2004 | Cadiz et al. |
| 2004/0236749 A1 | 11/2004 | Cortright et al. |
| 2004/0237048 A1 | 11/2004 | Tojo et al. |
| 2004/0239982 A1 | 12/2004 | Gignac |
| 2004/0250217 A1 | 12/2004 | Tojo et al. |
| 2004/0268228 A1 | 12/2004 | Croney et al. |
| 2004/0268265 A1 | 12/2004 | Berger |
| 2005/0005235 A1 | 1/2005 | Satterfield et al. |
| 2005/0010876 A1 | 1/2005 | Robertson et al. |
| 2005/0020243 A1 | 1/2005 | Benco et al. |
| 2005/0033603 A1 | 2/2005 | Suzuki et al. |
| 2005/0033698 A1* | 2/2005 | Chapman ............... 705/51 |
| 2005/0038856 A1 | 2/2005 | Krishnasamy et al. |
| 2005/0039140 A1 | 2/2005 | Chen |
| 2005/0041011 A1 | 2/2005 | Silfverberg et al. |
| 2005/0059418 A1 | 3/2005 | Northcutt |
| 2005/0060377 A1 | 3/2005 | Lo et al. |
| 2005/0071780 A1 | 3/2005 | Muller et al. |
| 2005/0079863 A1 | 4/2005 | Macaluso |
| 2005/0086611 A1 | 4/2005 | Takabe et al. |
| 2005/0091272 A1 | 4/2005 | Smith et al. |
| 2005/0094205 A1 | 5/2005 | Lo et al. |
| 2005/0114374 A1 | 5/2005 | Juszkiewicz et al. |
| 2005/0118996 A1 | 6/2005 | Lee et al. |
| 2005/0120306 A1 | 6/2005 | Klassen et al. |
| 2005/0138574 A1 | 6/2005 | Lin |
| 2005/0143135 A1 | 6/2005 | Brems et al. |
| 2005/0143138 A1 | 6/2005 | Lee et al. |
| 2005/0160376 A1 | 7/2005 | Sciammarella et al. |
| 2005/0163290 A1* | 7/2005 | Gilles et al. ............... 379/88.14 |
| 2005/0172001 A1 | 8/2005 | Zaner et al. |
| 2005/0182837 A1 | 8/2005 | Harris et al. |
| 2005/0188312 A1 | 8/2005 | Bocking et al. |
| 2005/0209994 A1 | 9/2005 | Noro et al. |
| 2005/0210104 A1 | 9/2005 | Torvinen |
| 2005/0221807 A1 | 10/2005 | Karlsson et al. |
| 2005/0229110 A1 | 10/2005 | Gegner et al. |
| 2005/0235225 A1 | 10/2005 | Pradhan et al. |
| 2005/0235226 A1 | 10/2005 | Watanabe et al. |
| 2005/0235251 A1 | 10/2005 | Arend et al. |
| 2005/0243979 A1 | 11/2005 | Starbuck et al. |
| 2005/0245236 A1 | 11/2005 | Servi et al. |
| 2005/0246654 A1 | 11/2005 | Hally et al. |
| 2005/0261011 A1 | 11/2005 | Scott |
| 2005/0261032 A1 | 11/2005 | Seo et al. |
| 2005/0262186 A1 | 11/2005 | Szeto et al. |
| 2005/0262204 A1 | 11/2005 | Szeto et al. |
| 2005/0268237 A1 | 12/2005 | Crane et al. |
| 2005/0278652 A1 | 12/2005 | Scholz |
| 2006/0009249 A1 | 1/2006 | Fu et al. |
| 2006/0010395 A1 | 1/2006 | Aaltonen |
| 2006/0030347 A1* | 2/2006 | Biswaas ............... 455/518 |
| 2006/0035632 A1 | 2/2006 | Sorvari et al. |
| 2006/0048076 A1 | 3/2006 | Vronay et al. |
| 2006/0053379 A1 | 3/2006 | Henderson et al. |
| 2006/0055700 A1 | 3/2006 | Niles et al. |
| 2006/0058010 A1 | 3/2006 | Williams et al. |
| 2006/0084410 A1 | 4/2006 | Sutaria et al. |
| 2006/0101350 A1 | 5/2006 | Scott |
| 2006/0112354 A1 | 5/2006 | Park et al. |
| 2006/0123360 A1 | 6/2006 | Anwar et al. |
| 2006/0140015 A1 | 6/2006 | Kasamsetty |
| 2006/0141996 A1 | 6/2006 | Huh |
| 2006/0143574 A1 | 6/2006 | Ito et al. |
| 2006/0146765 A1 | 7/2006 | Van De Sluis et al. |
| 2006/0148499 A1 | 7/2006 | Chie |
| 2006/0148522 A1 | 7/2006 | Chipchase et al. |
| 2006/0168539 A1 | 7/2006 | Hawkins et al. |
| 2006/0170945 A1 | 8/2006 | Bill |
| 2006/0174121 A1 | 8/2006 | Omae et al. |
| 2006/0174269 A1 | 8/2006 | Hansen-Turton |
| 2006/0212829 A1 | 9/2006 | Yahiro et al. |
| 2006/0223518 A1 | 10/2006 | Haney |
| 2006/0224675 A1 | 10/2006 | Fox et al. |
| 2006/0242581 A1 | 10/2006 | Manion et al. |
| 2006/0242597 A1 | 10/2006 | Park |
| 2006/0253787 A1 | 11/2006 | Fogg |
| 2006/0277488 A1 | 12/2006 | Cok et al. |
| 2006/0293057 A1 | 12/2006 | Mazerski et al. |
| 2007/0011617 A1 | 1/2007 | Akagawa et al. |
| 2007/0027920 A1 | 2/2007 | Alvarado et al. |
| 2007/0032267 A1 | 2/2007 | Haitani et al. |
| 2007/0033540 A1 | 2/2007 | Bridges et al. |
| 2007/0043688 A1* | 2/2007 | Kountz et al. ............... 707/1 |
| 2007/0060206 A1 | 3/2007 | Dam Nielsen et al. |
| 2007/0067738 A1 | 3/2007 | Flynt et al. |
| 2007/0072586 A1 | 3/2007 | Morhenn et al. |
| 2007/0073874 A1 | 3/2007 | Moghaddam et al. |
| 2007/0079246 A1 | 4/2007 | Morillon et al. |
| 2007/0118813 A1 | 5/2007 | Forstall et al. |
| 2007/0129112 A1 | 6/2007 | Tarn |
| 2007/0135103 A1* | 6/2007 | Middleton ............... 455/414.1 |
| 2007/0136360 A1 | 6/2007 | Randall et al. |
| 2007/0136687 A1 | 6/2007 | Pak |
| 2007/0150830 A1 | 6/2007 | Ording et al. |
| 2007/0162862 A1 | 7/2007 | Ogasawara et al. |
| 2007/0168262 A1 | 7/2007 | Morotomi et al. |
| 2007/0174389 A1 | 7/2007 | Armstrong et al. |
| 2007/0198947 A1 | 8/2007 | Cox et al. |
| 2007/0226645 A1 | 9/2007 | Kongqiao et al. |
| 2007/0250936 A1 | 10/2007 | Nakamura et al. |
| 2007/0268908 A1 | 11/2007 | Linkola et al. |
| 2007/0271528 A1 | 11/2007 | Park et al. |
| 2008/0014982 A1 | 1/2008 | Foxenland |
| 2008/0022228 A1 | 1/2008 | Kwon et al. |
| 2008/0034317 A1 | 2/2008 | Fard et al. |
| 2008/0059570 A1 | 3/2008 | Bill |

(56) References Cited

U.S. PATENT DOCUMENTS

| | | |
|---|---|---|
| 2008/0081653 A1 | 4/2008 | Mock et al. |
| 2008/0086703 A1 | 4/2008 | Flynt et al. |
| 2008/0098311 A1 | 4/2008 | Delarue et al. |
| 2008/0111826 A1 | 5/2008 | Endrikhovski et al. |
| 2008/0122870 A1 | 5/2008 | Brodersen et al. |
| 2008/0158189 A1 | 7/2008 | Kim |
| 2008/0172030 A1 | 7/2008 | Blomquist |
| 2008/0189614 A1 | 8/2008 | Jeong et al. |
| 2008/0189627 A1 | 8/2008 | Nikitin et al. |
| 2008/0194934 A1 | 8/2008 | Ray et al. |
| 2008/0215978 A1 | 9/2008 | Bamba |
| 2008/0220751 A1 | 9/2008 | De Bast |
| 2008/0220752 A1 | 9/2008 | Forstall et al. |
| 2008/0235248 A1 | 9/2008 | Krantz et al. |
| 2008/0256170 A1 | 10/2008 | Hayashi et al. |
| 2008/0261569 A1 | 10/2008 | Britt et al. |
| 2008/0263069 A1 | 10/2008 | Harris et al. |
| 2008/0280600 A1 | 11/2008 | Zhou |
| 2008/0282158 A1 | 11/2008 | Aaltonen et al. |
| 2008/0288612 A1 | 11/2008 | Kwon |
| 2008/0288880 A1 | 11/2008 | Reponen et al. |
| 2009/0013048 A1 | 1/2009 | Partaker et al. |
| 2009/0040875 A1 | 2/2009 | Buzescu et al. |
| 2009/0043847 A1 | 2/2009 | Laurila |
| 2009/0055484 A1 | 2/2009 | Vuong et al. |
| 2009/0077496 A1 | 3/2009 | Aravamudan et al. |
| 2009/0100363 A1 | 4/2009 | Pegg et al. |
| 2009/0164923 A1 | 6/2009 | Ovi |
| 2009/0187630 A1 | 7/2009 | Narayanaswami et al. |
| 2009/0193512 A1 | 7/2009 | Buckley et al. |
| 2009/0199120 A1 | 8/2009 | Baxter et al. |
| 2009/0228513 A1 | 9/2009 | Tian |
| 2009/0300518 A1 | 12/2009 | Mock et al. |
| 2009/0303188 A1 | 12/2009 | Triplett |
| 2010/0004008 A1 | 1/2010 | Abolrous et al. |
| 2010/0020727 A1 | 1/2010 | Narayan et al. |
| 2010/0020953 A1 | 1/2010 | Lidstrom et al. |
| 2010/0050123 A1 | 2/2010 | Sherrard et al. |
| 2010/0062753 A1 | 3/2010 | Wen et al. |
| 2010/0064231 A1 | 3/2010 | Gupta |
| 2010/0094837 A1 | 4/2010 | O'Sullivan et al. |
| 2010/0095009 A1 | 4/2010 | Matuszewski et al. |
| 2010/0144331 A1 | 6/2010 | Koberg et al. |
| 2010/0153886 A1 | 6/2010 | Hautala |
| 2010/0180001 A1 | 7/2010 | Hardt |
| 2010/0190467 A1 | 7/2010 | Scott et al. |
| 2010/0190468 A1 | 7/2010 | Scott et al. |
| 2010/0245262 A1 | 9/2010 | Vance et al. |
| 2010/0248701 A1 | 9/2010 | Vance et al. |
| 2010/0250606 A1 | 9/2010 | Vance et al. |
| 2010/0287504 A1 | 11/2010 | Vance et al. |
| 2010/0333029 A1 | 12/2010 | Smith et al. |
| 2011/0029892 A1 | 2/2011 | Kurtz et al. |
| 2011/0258547 A1 | 10/2011 | Symons et al. |
| 2012/0071244 A1 | 3/2012 | Gillo et al. |
| 2013/0019173 A1 | 1/2013 | Kotler et al. |
| 2013/0019203 A1 | 1/2013 | Kotler et al. |
| 2013/0024780 A1 | 1/2013 | Sutedja et al. |
| 2013/0275897 A1 | 10/2013 | Vance et al. |
| 2013/0281161 A1 | 10/2013 | Vance et al. |
| 2013/0283180 A1 | 10/2013 | Vance et al. |
| 2014/0033071 A1 | 1/2014 | Gruber et al. |
| 2014/0220942 A1 | 8/2014 | Vance et al. |
| 2015/0072644 A1 | 3/2015 | Sherrard et al. |
| 2015/0220220 A1 | 8/2015 | Sherrard et al. |
| 2016/0078097 A1 | 3/2016 | Vance et al. |
| 2017/0116532 A1 | 4/2017 | Vance et al. |
| 2017/0124175 A1 | 5/2017 | Vance et al. |
| 2017/0339079 A1 | 11/2017 | Appelman et al. |
| 2018/0295223 A1 | 10/2018 | Vance et al. |
| 2019/0116471 A1 | 4/2019 | Vance et al. |

FOREIGN PATENT DOCUMENTS

| | | |
|---|---|---|
| EP | 1246434 | 10/2002 |
| EP | 1469374 A1 | 10/2004 |
| EP | 1482758 A1 | 12/2004 |
| EP | 1571808 | 9/2005 |
| EP | 1608190 A1 | 12/2005 |
| JP | 07-129363 | 5/1995 |
| JP | 08-123658 | 5/1996 |
| JP | 09-083630 | 3/1997 |
| JP | 09-311661 | 12/1997 |
| JP | H11-088496 | 3/1999 |
| JP | H11-327741 | 11/1999 |
| JP | 2000-259304 | 9/2000 |
| JP | 2000-348058 | 12/2000 |
| JP | 2003-198705 | 7/2003 |
| JP | 2004-208217 | 7/2004 |
| JP | 2004-348601 | 12/2004 |
| JP | 2005-072958 | 3/2005 |
| JP | 3834039 B2 | 10/2006 |
| JP | 2002-009899 A | 1/2011 |
| KR | 10-2002-0069964 A | 9/2002 |
| KR | 10-2004-0024967 A | 3/2004 |
| KR | 10-2005-0043148 A | 5/2005 |
| KR | 10-2006-0042808 A | 5/2005 |
| KR | 10-2007-0029009 A | 3/2007 |
| KR | 10-2008-0004127 A | 1/2008 |
| KR | 10-2008-0019614 A | 3/2008 |
| KR | 10-2008-0079716 A | 9/2008 |
| WO | WO 00/25501 | 5/2000 |
| WO | WO 03/044756 A1 | 5/2003 |
| WO | WO 03/062976 A1 | 7/2003 |
| WO | WO 2005/045799 | 5/2005 |
| WO | WO 2005/064441 A1 | 7/2005 |
| WO | WO 2005/120112 A1 | 12/2005 |
| WO | WO 2006/016227 A2 | 2/2006 |
| WO | WO 2006/067567 A1 | 6/2006 |
| WO | WO 2007/093997 A1 | 8/2007 |
| WO | WO 2007/143678 A2 | 12/2007 |
| WO | WO 2008/030776 A2 | 3/2008 |
| WO | WO 2010/111610 A2 | 9/2010 |
| WO | WO 2010/111614 A2 | 9/2010 |
| WO | WO 2010/111637 A2 | 9/2010 |
| WO | WO 2010/111642 A2 | 9/2010 |
| WO | WO 2010/111643 A2 | 9/2010 |
| WO | WO 2010/111670 A2 | 9/2010 |
| WO | WO 2010/111675 A2 | 9/2010 |
| WO | WO 2010/111679 A2 | 9/2010 |

OTHER PUBLICATIONS

"Alltel to Offer Free-Calling Plan, With Limits". Ken Belson. New York Times. (Late Edition (East Coast)). New York, N.Y.: Apr. 21, 2006. p. C.9.*

International Preliminary Preport on Patentability in application No. PCT/US2010/028960 dated Sep. 27, 2011.

International Preliminary Report on Patentability in application No. PCT/2010/028863 mailed Sep. 27, 2011.

International Preliminary Report on Patentability in application No. PCT/US/2010/028904 mailed Sep. 27, 2011.

International Preliminary Report on Patentability in application No. PCT/US2010/028857 mailed Sep. 27, 2011.

International Preliminary Report on Patentability in application No. PCT/US2010/028894 mailed Sep. 27, 2011.

International Preliminary Report on Patentability in application No. PCT/US2010/028905 mailed on Sep. 27, 2011.

International Preliminary Report on Patentability in application No. PCT/US2010/028947 mailed Sep. 27, 2011.

International Preliminary Report on Patentability in application No. PCT/US2010/028954 mailed Sep. 27, 2011.

Office Action in R.O.C. Application No. 098304597 dated Dec. 15, 2011, in 4 pages.

Weisser, Cybele and Farnoosh Torabi, What do you pay to Stay Connected? http://money.cnn.com/2003/11/20/pf/portability_strategy_0312/index.htm, Money Magazine, Nov. 24, 2003.

(56) References Cited

OTHER PUBLICATIONS

Alltel Launches 'My Circle,' a One-of-a-Kind Program That Gives Customers Free Calls to Any Network or Number They Choose, Business Wire, Apr. 20, 2006, pp. 1, New York.
Alltel's 'My Circle' Plan Lets Subscribers Adds 10 Numbers for Unlimited Calls, Wireless News, Apr. 23, 2006, pp. 2, Coventry.
Cuneo, Alice Z., Alltel Gets Aggressive in Telecom War, Advertising Age, Apr. 24, 2006, vol. 77, Issue 17, pp. 8, 1 pg., Chicago (Midwest region edition).
"Alltel Corp at Lehman Brothers Worldwide Wireless, Wirelein, and Media Conference". Fair Disclosure Wire. May 22, 2006.
"Alltel's free wireless calling plan paying off", Virgil Larson, Knight Rider Tribune Business News, May 2005, 2 pages.
First Office Action in European Application No. 07812026.8 dated Jul. 17, 2012.
"MobileCom provides all residential pay as you go subscribers the ability to talk for 1 piaster per minute day and night", Mar. 14, 2006, www.albawaba.com.
European Search Report (PCT/US2006022645), Sep. 6, 2011.
International Search Report (PCT/US2007070475)., Jun. 29, 2011.
International Search Report (PCT/US2010/028857)., Oct. 11, 2010.
International Search Report (PCT/US2010/028863)., Oct. 22, 2010.
International Search Report (PCT/US2010/028894)., Nov. 12, 2010.
International Search Report (PCT/US2010/028904)., Nov. 8, 2010.
International Search Report (PCT/US2010/028905)., Nov. 12, 2010.
International Search Report (PCT/US2010/028947)., Nov. 12, 2010.
International Search Report (PCT/US2010/028954)., Oct. 27, 2010.
International Search Report (PCT/US2010/028960)., Oct. 26, 2010.
Office Action in Canadian Application No. 2588250 dated Aug. 23, 2013.
Sellers, Patricia, "MCI Communications Yes, Brands Can Still Work Magic", Feb. 7, 1994, www.money.cnn.com.
Office Action in Canadian Application No. 2657240 dated Sep. 3, 2013.
Boy Genius, LG Xenon hitting AT&T Before Christmas?, http://www.boygeniusreport.com/2008/09/24/lg-xenon-hitting-att-before-christmas/, Sep. 24, 2008, pp. 1.
LG Xenon User Guide, AT&T, Apr. 8, 2009, pp. 146.
Second Office Action in Chinese Application No. 200680020479.9 mailed Mar. 22, 2012.
International Preliminary Report on Patentability in application No. PCT/2010/028863 dated Sep. 27, 2011.
International Preliminary Report on Patentability in application No. PCT/US/2010/028904 dated Sep. 27, 2011.
International Preliminary Report on Patentability in application No. PCT/US2010/028857 dated Sep. 27, 2011.
International Preliminary Report on Patentability in application No. PCT/US2010/028894 dated Sep. 27, 2011.
International Preliminary Report on Patentability in application No. PCT/US2010/028905 dated Sep. 27, 2011.
International Preliminary Report on Patentability in application No. PCT/US2010/028947 dated Sep. 27, 2011.
International Preliminary Report on Patentability in application No. PCT/US2010/028954 dated Sep. 27, 2011.
International Preliminary Report on Patentability in application No. PCT/US2010/028960 dated Sep. 27, 2011.
Office Action in Indian Application No. 10055/DELNP/2007 dated Jun. 8, 2018.

* cited by examiner

| | | |
|---|---|---|
| 200 | MSISDN | 96837510064721 |
| 205 | Allowed contacts | 5 |
| 210a | Number 1 | 00000012065551234 |
| | Name 1 | Uncle Scott |
| 210b | Number 2 | 00000000000000000 |
| | Name 2 | 0 |
| 210c | Number 3 | 000001102076150013 |
| | Name 3 | George Smythe |
| 210d | Number 4 | 00000018065553612 |
| | Name 4 | Sue Johnson |
| 210e | Number 5 | 00000014255551631 |
| | Name 5 | Mom |

| MSISDN | Time stamp | Allowed contacts | Account type | Number 1 | Name 1 | Service provider | ... | Number 5 | Name 5 | Service provider |
|---|---|---|---|---|---|---|---|---|---|---|
| 9683751000064721 | 01:30:27 1/01/01 | 5 | standard | 0000001206551234 | Uncle Scott | ø3 | ... | 00000014255551631 | Mom | ø4 |
| 3176597883921l | 06:29:12 6/05/06 | 5 | standard | 0000000000000000 | ø | ø | ... | 00000000000000000 | ø | ø |
| 7369287600153l1 | 16:25:01 3/09/04 | 5 | prepaid | 0000110207615OO13 | George Smythe | ø7 | ... | 00000000000000000 | ø | ø |

FIG. 4 though only a limited number of fields are shown in the table, it will be appreciated that any number of fields may be maintained by the service management system to characterize a service plan. Moreover, an individual subscriber's

SERVICE MANAGEMENT SYSTEM THAT ENABLES SUBSCRIBER-DRIVEN CHANGES TO SERVICE PLANS

CROSS-REFERENCE TO RELATED APPLICATIONS

This application is a divisional of U.S. application Ser. No. 11/449,383, filed Jun. 7, 2006.

TECHNICAL FIELD

The present invention relates to managing service plans in mobile telecommunication systems.

BACKGROUND

Most consumers who use mobile telecommunication devices rarely change aspects of their service plan with their mobile service provider. This rarity may be attributed to the time and effort required to effect the service plan change. To make a change, a subscriber must typically initiate contact with the service provider via a telephone call to customer service or via a self-help system on the service provider's website. Once contact is initiated, implementing a change can be a multi-step process that takes a certain amount of time to complete and a certain understanding of all of the service plan options to make an informed decision. While most service providers strive to simplify this process, the change process may sometimes discourage subscribers from making a change to their service on a frequent basis.

Even if a service provider simplifies the process of changing aspects of a subscriber's service plan, the process is often not performed in a subscriber-friendly fashion. Changes are rarely implemented immediately, and may take twenty-four (24) hours or more to propagate through the service provider's systems. While most consumers are willing to accept this delay, the lack of immediate feedback to the consumer is a sub-optimal experience. Most consumers would prefer a service provider that reduces the time and effort necessary to change a service plan, such as by eliminating the need to personally contact the service provider. Most consumers would also prefer a service provider that completed a requested change immediately. If such an offering existed, it is expected that subscribers would more frequently make changes to their service plan and would ultimately be more satisfied with the service that they receive.

BRIEF DESCRIPTION OF THE DRAWINGS

FIG. 2 is a block diagram illustrating aspects of a service plan stored in a mobile device of a subscriber.

FIG. 4 is a block diagram illustrating records in a subscriber database accessed by the service management system.

DETAILED DESCRIPTION

Figure 1:
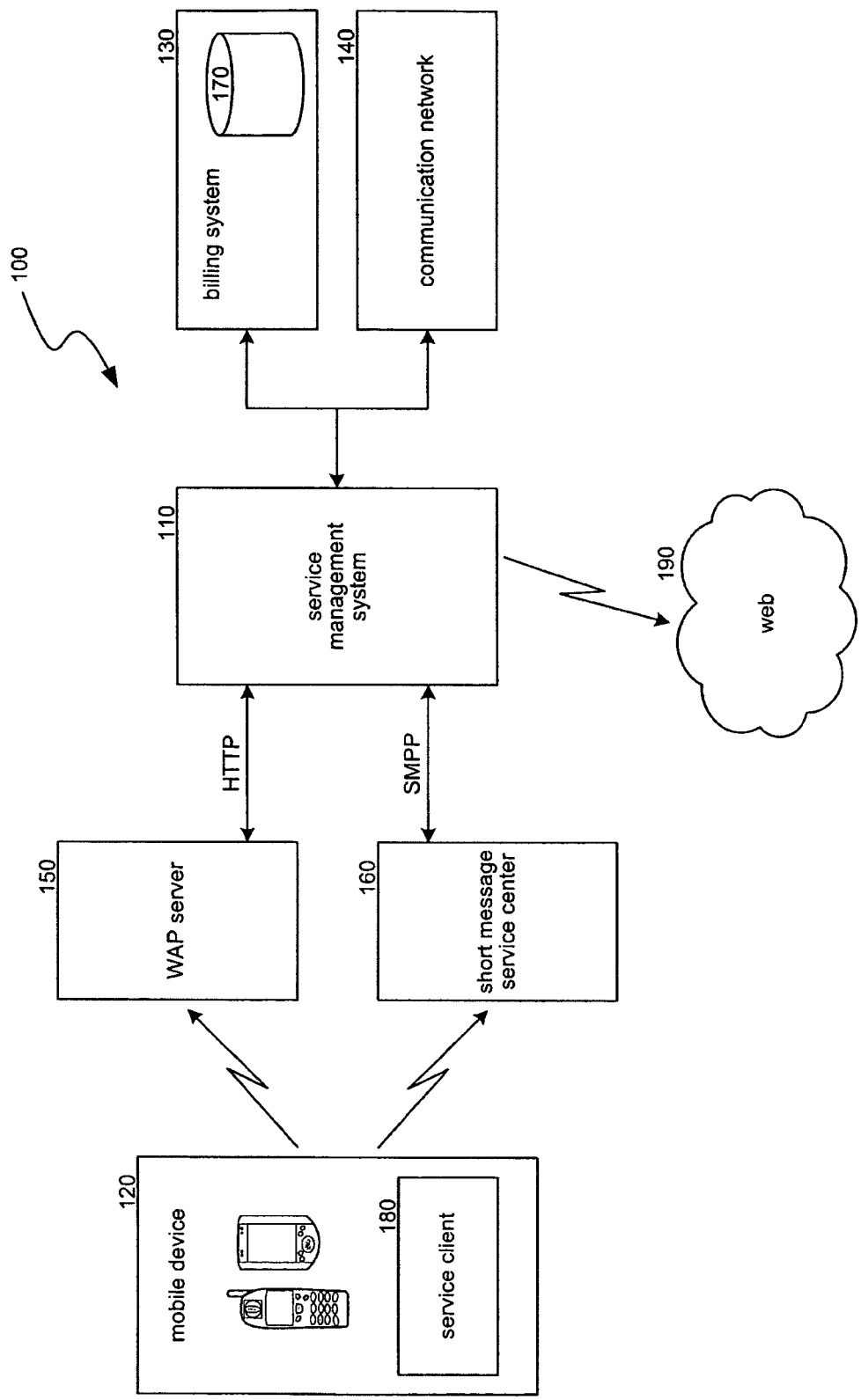
FIG. 1 is a block diagram illustrating components of a telecommunication system that enables subscriber-driven changes to a service plan.

A service management system is disclosed that enables a subscriber of a mobile telecommunication system to modify aspects of his or her service plan and have the modification to the service plan take effect immediately. The subscriber effects changes to his or her service plan via a mobile device interface or via a non-mobile computer interface. The subscriber directly enters a modification to an aspect of the plan. The subscriber's proposed modification is verified against a set of rules that defines acceptable changes to the service plan. If the proposed modification to the service plan is a valid change, the change is immediately propagated to a billing system and to other systems that implement the service plan. The subscriber is notified when the modification to the service plan is complete, and the subscriber is billed on a going-forward basis in accordance with the rate structure applicable to the plan. Subscribers benefit under the system because changes are easily made by the subscriber and implemented in a timely fashion. As a result, overall subscriber satisfaction with the service provider is enhanced.

In some embodiments of the system, the provider's service plan allows subscribers to create a contact group containing a limited number of people or services. Communications to and/or from the people or services in the contact group are billed at a reduced rate (e.g., all communications are free, all communications are billed at a fixed monthly fee, all communications are billed at a reduced rate). The subscriber is allowed to periodically change the members of the contact group, with the service plan's billing scheme being applied to the new members in the contact group as soon as any change is made. Certain rules are applied to the composition of the contact group, including the allowed frequency of updates to the group, thereby constraining some of the modifications that the subscriber can make to the group. Any modifications to the service plan proposed by the subscriber are therefore verified by the service management system against a set of rules that characterize acceptable changes before being implemented.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

FIG. 1 is a block diagram illustrating some of the components of a mobile telecommunication system 100 that includes a service management system 110 that allows subscribers to manage aspects of a service plan offered by a service provider in substantially real-time. The service management system 110 acts as an intermediary between a population of subscribers using mobile devices 120, a billing system 130, and a communication network 140 that enable the subscribers to receive mobile telecommunications services in exchange for a fee. Mobile devices 120 may include mobile phones, mobile personal digital assistants (e.g., Palms, PocketPCs, Blackberries or Treos), or any other mobile device having a service plan. The mobile devices 120 may each contain a service client 180 that in conjunction with the service management system 110 allows a subscriber to manage aspects of his or her service plan.

For purposes of this description, a group-centric service plan is used as a representative service plan managed by the subscriber. In a group-centric plan, a subscriber is allowed to define a set of contact numbers in a contact group. A contact number can represent either a person or a service, for example, a service that receives emailed images and automatically prints the received image. Communications made between the subscriber and any of the contact numbers in the contact group are billed at a different rate than communications with contact numbers that are not in the contact group. For example, the subscriber may be billed at a flat rate for all communications with members in the contact group, at a discount for each communication with members in the group, or all communications with members in the group might be free. Alternatively, communications made between the subscriber and any of the contact numbers in the contact group may be provided with preferential service or a feature that is not accessible to communications with contact numbers that are not in the contact group. For example, the subscriber may be provided with the ability to simultaneously broadcast the same message to members of his or her contact group, but not to members outside of his or her contact group. As another example, the subscriber may be provided with special ringtones for members of his or her contact group. In this context, "communication" means the transmission or receipt by the subscriber of any voice call, text, SMS message, instant message, email, picture, music, or any other data. The size of the contact group may vary significantly, but often the group contains twenty or less contact numbers. Moreover, members of the group can be associated with any telecommunication network, whether wired or wireless. That is, the contact numbers do not necessarily represent people or services that are serviced by the same mobile telecommunication system 100 as the subscriber. Additional information about a group-centric service plan is described in greater detail in U.S. patent application Ser. No. 11/400,925, entitled "Preferred Contact Group Centric Interface," filed on 10 Apr. 2006, now U.S. Pat. No. 7,685,530, and incorporated in its entirety by this reference. While a group-centric service plan is used as a representative service plan throughout this description, it will be appreciated that the technology described herein is applicable to many other types of service plans as well. The described system is intended to apply to any service plan that would benefit from allowing a subscriber to make periodic modifications to the service plan, wherein the modifications are immediately implemented.

As shown in FIG. 1, the service management system 110 may communicate with mobile devices through a number of different communication paths. In the depicted embodiment, two communication paths are shown. The first path allows the mobile devices 120 to communicate with the service management system 110 through a WAP (Wireless Application Protocol) server 150. Those skilled in the art will appreciate that the WAP protocol enables mobile devices to access WAP-enabled websites and exchange information such as World Wide Web content using the hyper-text transfer protocol (HTTP). The second path allows the mobile devices 120 to communicate with the service management system 110 through a short message service (SMS) center 160. Those skilled in the art will appreciate that the SMS center stores and forwards SMS messages between the mobile devices and the service management system using the short messaging service peer-to-peer protocol (SMPP).

The service management system 110 also communicates with other components of the mobile telecommunications system 100 such as the billing system 130 and the communication network 140. The billing system 130 is an industry-standard billing system that bills for all communications made by a subscriber of a mobile device 120 during a billing period. The billing system includes a database 170 that maintains accurate and complete records of all billed uses of the telecommunication system 100 for each subscriber. The communication network 140 broadly encompasses all of the other systems in the telecommunication system that enables a mobile subscriber to have end-to-end connectivity with other people or services. The service management system 110 is also connected to the World Wide Web 190 as necessary to implement the functionality described herein. Those skilled in the art will appreciate that other standard systems and connections have been omitted from the mobile telecommunications system 100 for clarity.

Mobile devices 120 may include a service client 180 that uniquely identifies the subscriber and interfaces with the subscriber management system 110. The service client 180 maintains a record of certain subscriber-modifiable elements of the service plan. For example, in an embodiment wherein the service plan is a group-centric service plan, the service client 180 includes a table that identifies all of the contacts in a contact group. FIG. 2 is a representative service plan table 195 that is maintained by the service client 180. The table includes a number of fields that pertain to the service plan, including: a Mobile Subscriber ISDN Number field 200, which contains a number that uniquely identifies the subscriber to the service provider; an allowed contacts field 205, which contains a number that sets the size of (i.e., the number of contacts in) the contact group; and group contact fields 210a, 210b, . . . 210e. Each group contact fields 210a, 210b, . . . 210e identifies a contact by contact number and by subscriber-defined name. The contact number may be a phone number, an IP address, or any unique identifier that can be used to complete a communication with another person or service. The format of the contact number and subscriber-defined name may vary, but in an embodiment of the system seventeen digits are provided for the contact number and sixteen digits are provided for the subscriber-defined name. The service plan table 195 is maintained by the service client 180, and modifications to the service plan table are made in accordance with the process described below.

Prior to managing his or her service plan, a subscriber may first contact his or her service provider in order to activate the service plan. Contact with the service provider may be made in a variety of ways, including using the mobile device to send an SMS message to the provider or to visit a WAP webpage offered by the provider. Alternatively, the subscriber may contact the service provider by visiting the service provider's website using a laptop or desktop computer, by calling the service provider's customer service, or by visiting any of the service provider's retail stores and interacting with a sales person. After the service provider confirms that the subscriber is eligible to participate in the service plan, the service management system 110 and the service client 180 are each provisioned to configure the subscriber for service. In the case of the mobile device, the service management system 110 sends a command to the service client 180 turning the client "on." At this point, the subscriber is allowed to begin managing aspects of his or her service plan and making modifications to certain aspects of the plan.

If the subscriber has activated a group-centric service plan, one of the aspects of the plan that the subscriber is allowed to manage is the composition of the contact group. When the service management system activates a group-centric plan it may populate all of the group contact fields 210a, 210b, . . . 210e in the service client 180 with zeros as an initial state, signifying that the subscriber has no contacts. After activation, the subscriber is allowed to populate the contact group with a desired group of people or services and manage the composition of the group over time. Information about the user interface that may be incorporated in the mobile device 120 to allow subscribers to modify the composition of their contact group is described in greater detail in the previously-referenced U.S. patent application entitled "Preferred Contact Group Centric Interface." The subscriber is allowed to add new contacts into his or her contact group, change the contact number or contact name of existing contacts, and delete contacts from his or her contact group by making a modification request to the service management system 110. The modification request may be generated by the subscriber using the subscriber's mobile device (e.g., via an SMS message or WAP page) or by accessing the service provider's website using a non-mobile computing device. In an embodiment, the modification request is submitted to the service management system 110 in the following form:

[command] [position number] [contact number] [contact name]

e.g., modify 02 4255551616 Alice

Where [command] is the desired command, [position number] is the numerical position of the contact within the contact group that is to be modified, and [contact number] and [contact name] are the contact details entered by the subscriber. In the example modification request made above, the subscriber is requesting that the second contact (position 02) in the contact group be modified so that the contact number is "425-555-1616" and the name is "Alice." In an embodiment of the system, the command field is a two digit code, with each combination of digits representing a different command (e.g., modify="01"). Various other commands may therefore be supported by the system, as will be described in additional detail below.

Figure 3:
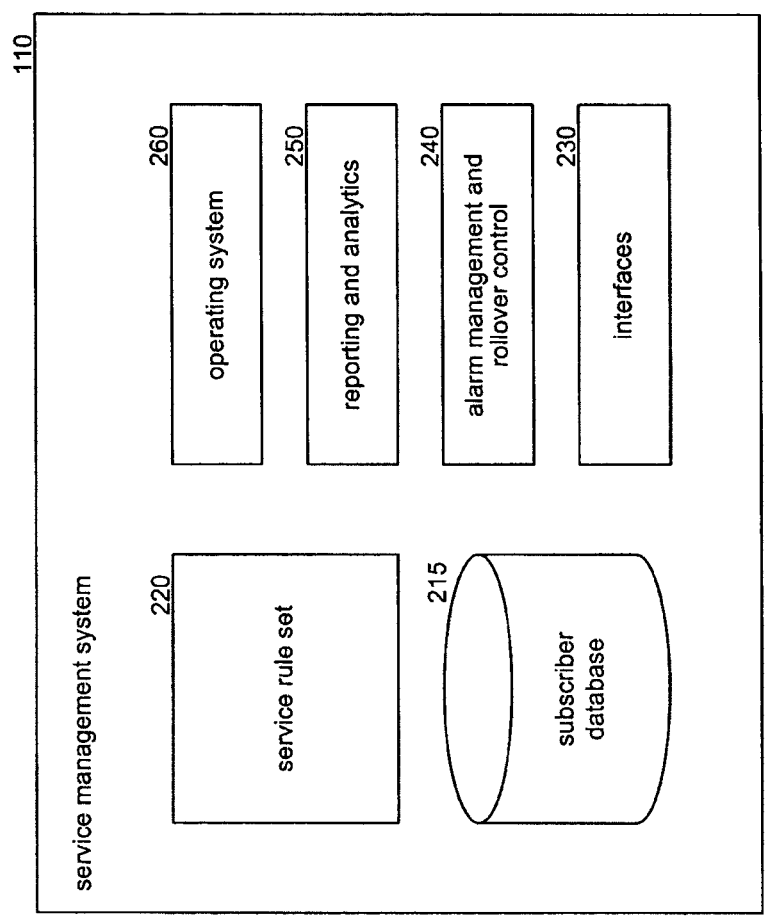
FIG. 3 is a block diagram illustrating components of a service management system.

FIG. 3 is a block diagram illustrating the various components of the service management system 110 that receives the modification request and allows a subscriber to change an aspect of his or her service plan so that the changes are immediately implemented and reflected in how the subscriber is billed. As will be described in greater detail below, the service management system includes a service rule set 220 that defines those conditions under which the subscribers may modify their service plan. The service management system includes a subscriber database 215 that contains details about subscriber service plans, including those aspects of the service plan that may be manipulated by a subscriber. When the service plan is the group-centric plan described above, the subscriber database stores the identity of the people or services contained in the subscriber's contact group. FIG. 4 is a representative table 300 of the type of information that may be stored in the database for a group-centric plan.

As depicted in FIG. 4, each record 310 in the table 300 represents one subscriber and the identity of all contacts that the subscriber maintains in his or her contact group. Each record 310 contains a number of fields, including: a Mobile Subscriber ISDN Number field 320, a time stamp field 330, an allowed contacts field 340, an account type field 350, and a number of group contact fields 360a, 360b, . . . 360n. The Mobile Subscriber ISDN Number field 320 contains a number that uniquely identifies the subscriber for the service provider. In the sample record 370, the number is the 15 digit code "968375100064721." The time stamp field 330 contains a timestamp that indicates when the subscriber was first provisioned with the service plan. The allowed contacts field 340 contains a number that is set by the service provider to reflect the maximum number of contacts that the subscriber may have in his or her contact group. In the sample record 370, the number of contacts is set for five. The account type field 350 contains a code number reflecting the type of account that the subscriber maintains with the service provider. For each person in a subscriber's contact group, the group contact fields 360a, 360b, . . . 360n contain a contact number 375, a subscriber-defined name 380 of the contact, and a service provider code 385. The contact number may be a phone number, an IP address, or any unique identifier that can be used to complete a communication with another person or service. The format of the contact number and subscriber-defined name may vary, but in an embodiment of the system seventeen digits are provided for the contact number and sixteen digits are provided for the subscriber-defined name. The service provider code is a code that identifies the service provider that the contact is associated with. As was previously described, the service plan may include communications between the subscriber and people or services in other service networks, so the service provider code is stored to both track the number of contacts that are in other networks as well as facilitate communication with those networks. It will be appreciated that the order of contacts in the database record 310 may correspond to the order of contacts in the display provided to the subscriber on the mobile device. For example, in record 370 the first contact is identified as "Uncle Scott" and the fifth contact is identified as "Mom." These contacts would be displayed in the first and fifth locations, respectfully, on the mobile device. The contact numbers for Uncle Scott and Mom are provided, and it is noted that Uncle Scott and Mom use different service providers than the subscriber. When a subscriber first activates his or her service plan, the subscriber record 310 is populated with details of the service plan and zeros in all group contact fields 360a, 360b, . . . 360n. For example, record 390 represents a new subscriber that has recently activated the group-centric service plan. Record 395 represents a subscriber that has activated a group-centric service plan, but has not yet populated all of the contacts in the contact group as evidenced by the zeros in group contract field 360n.

While FIGS. 2 and 4 depict a table whose contents and organization are designed to make them more comprehensible to the human reader, those skilled in the art will appreciate that the actual data structure(s) used by the system to store this information may differ from the tables shown, in that they, for example, may be organized in a different manner, may contain more or less information than shown, may be compressed and/or encrypted, and may be optimized in a variety of ways.

Returning to FIG. 3, when a modification request is received by the service management system 110 it is acted on in substantially real-time to either implement the modification request or to reject the modification request if it fails to satisfy the rules that govern allowed modifications. A process implemented by the service management system 110 to implement or reject the modification request is depicted in FIGS. 5A and 5B.

Figure 5A:
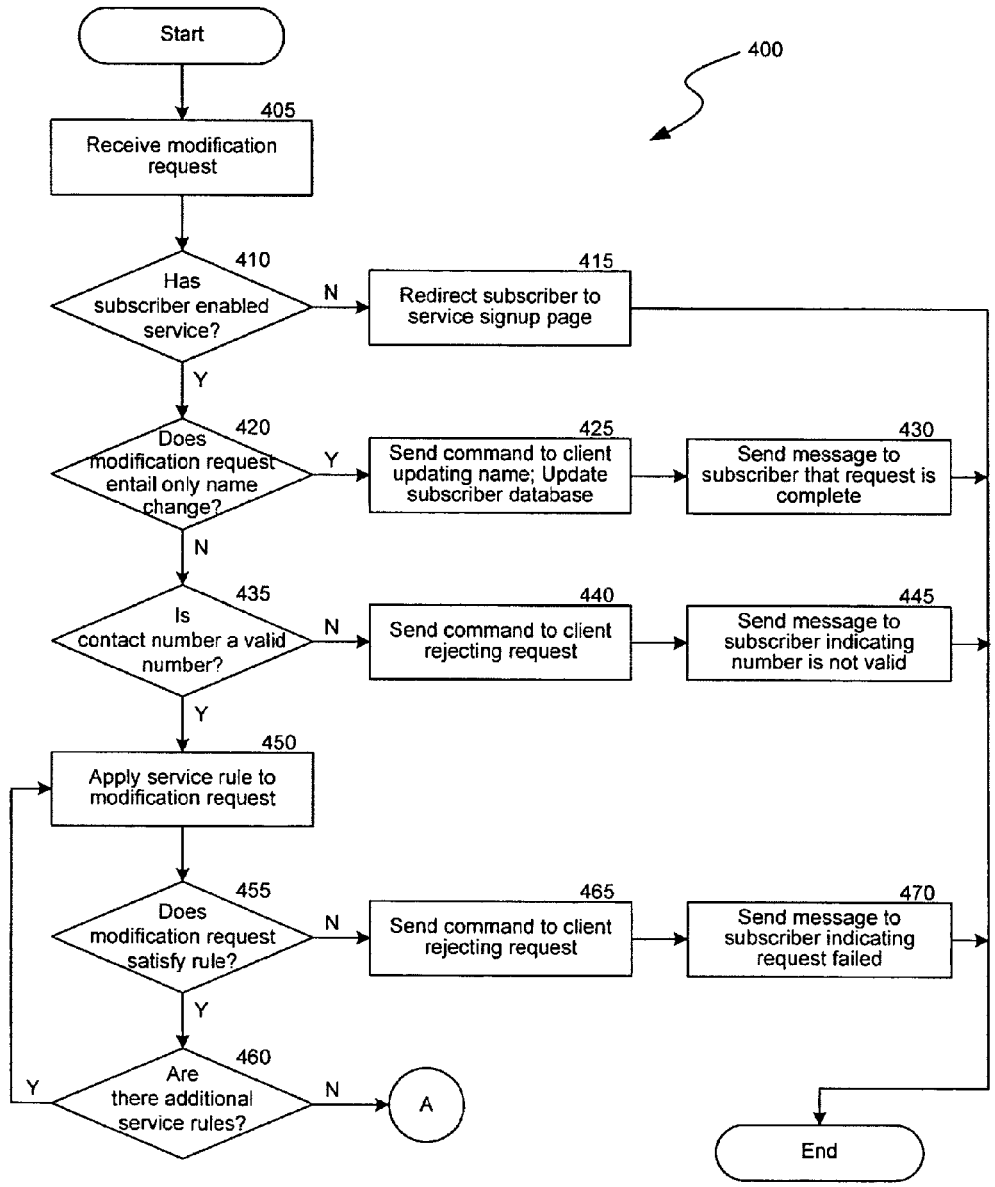
FIGS. 5A and 5B are flow diagrams illustrating the processing of a request by a subscriber to modify an aspect of his or her service plan.
Figure 5B:
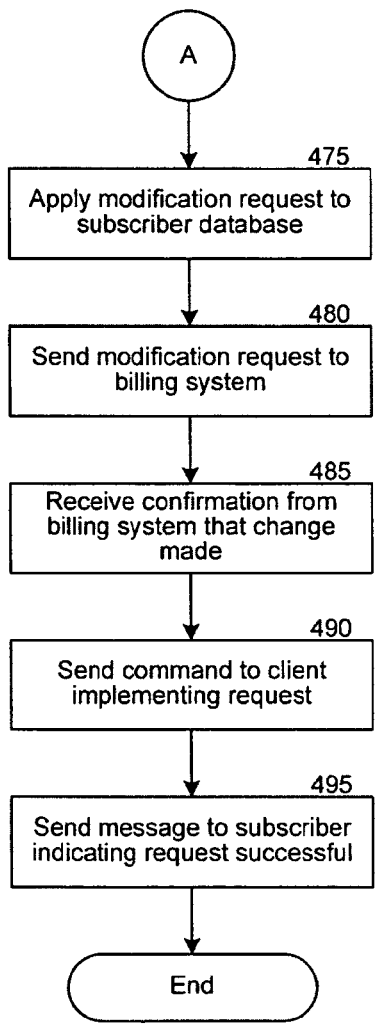

FIGS. 5A and 5B are flow charts that illustrate portions of a process 400 implemented by the service management system 110 to allow subscribers to manage an aspect of their service plan. The flow chart depicted in FIGS. 5A and 5B is suitable for a group-centric service plan, but may be modified as appropriate for other types of service plans. At a block 405, a request is received from a subscriber to modify one of the contacts in his or her contact group. As was previously discussed, the modification request is received in the following form: [command] [position number] [contact number] [contact name], where [command] is the command to modify, [position number] is the numerical position of the contact within the contact group that is to be modified, and [contact number] and [contact name] are the contact details entered by the subscriber. Note that the modify command can be used to represent a number of different subscriber requests such as adding a contact to the contact group, deleting a contact from the contact group, or changing the position number, contact number or contact name of a contact. For example, deleting a contact may involve inserting all zeros in the corresponding record. Those skilled in the art will appreciate that commands other than "modify" may also be used to manipulate entries within the contact group.

At a block 410, the service management system determines if the subscriber has activated the service plan that the subscriber is seeking to modify. If the subscriber has not activated the service plan, at a block 415 the subscriber is redirected to a service sign-up page. The service sign-up page may be communicated to the subscriber using an SMS message, web-page redirect, or by other contact method. After redirecting the subscriber, the process terminates pending the subscriber activating the service.

If the subscriber has activated the service plan that he or she is seeking to modify, at a decision block 420 the service management system determines whether the modification request entails only a name change. Modification requests that entail only a name change may be processed with less scrutiny by the system, as the decision of what name to associate with a contact number in the service plan is entirely within the discretion of the subscriber. One way to determine if only a name change has been requested is to compare the request with the associated subscriber record in the subscriber database 215. If only a name change is required, at a block 425 the service management system sends a command updating the name to the service client 180 in the subscriber's mobile device 120. The service management system also updates the subscriber record in the subscriber database 215 to reflect the new name for the identified contact. It will be appreciated that the definitive record of the subscriber's contact group is maintained in the subscriber database 215 by the service management system 110, and that any modifications to the record are made both locally in the service management system 110 and remotely at the subscriber's mobile device 120. At a block 430, the service management system sends a message to the subscriber confirming that the modification request has been completed. Once the modification request has been acted on, processing of the request is complete.

If the modification request entails more than a change to a contact name, processing continues to decision block 435. At decision block 435, the service management system performs a test to determine whether the received contact number in the modification request is a valid contact number. Different rules may be applied to determine that a contact number is valid, but in an embodiment of the system a contact number is considered to be valid if it falls within a certain geography (e.g., within the continental United States) and does not fall on the list of certain numbers that should be excluded (e.g., due to past problems with fraud on an excluded number). If the contact number is found not to be a valid number, at a block 440 the service management system sends a command to the service client 180 rejecting the modification request. When the service client 180 receives the command rejecting the request, the modification request is discarded and no changes are made to the contact group maintained in the service client 180. At a block 445, the service management system sends a message to the subscriber indicating that the entered contact number is not a valid number and that processing of the modification request has been halted. An option may be given to the subscriber to re-enter or otherwise correct the contact number. If such an option is provided, processing of the modification request would begin again at block 405.

If the contact number is found to be a valid number at decision block 435, processing continues to a block 450. At block 450, one of a plurality of service rules may be applied to the modification request. Service rules are defined by the service provider to set limits on what actions a subscriber may take in changing aspects of his or her service plan. For example, in some embodiments of the system the service provider may set a rule that each contact in the contact group cannot be modified more than once a month or once every X days. In other embodiments, a rule may be set that a subscriber can only make a certain number of modifications a month (e.g., five). Subscribers may therefore decide whether to change one contact multiple times or multiple contacts one (or more) times. The service rules are stored in the service rule set 220, and accessed by the service management system 110. At a decision block 455, the service management system performs a test to determine whether the modification request satisfies the applied service rule. If the modification request satisfies the service rule, processing continues to a decision block 460 where the service management system determines whether there are additional service rules to apply. If additional rules need to be applied, processing returns to block 450 to apply the next service rule. If no additional rules need to be applied (and by implication, all previous service rules have been satisfied), processing continues to a block 475. It will be appreciated that the number of service rules is in the discretion of the service provider, and may range anywhere from zero (i.e., no rules are applied) to a large number of interdependent rules that would require more complex processing to determine whether they are satisfied.

If the modification request fails to satisfy any of the applied service rules at decision block 455, processing continues to a block 465. At block 465 the service management system sends a command to the service client 180 rejecting the modification request. When the service client 180 receives the command rejecting the request, the modification request is discarded and no changes are made to the contact group maintained in the service client 180. At a block 470, the service management system sends a message to the subscriber indicating that the modification request will not be made because the request failed to satisfy one of the service rules. Additional details about why the request failed may also be provided to the subscriber in the message. Once the modification request has been rejected, further processing is terminated.

Returning to block 475, the modification request may be acted upon since the modification request has satisfied all of the service rules and other tests. At block 475, the service management system 110 makes the appropriate modification to the subscriber database 215 by updating the contents of the subscriber's record. In the example modification request presented above, this would entail changing the second contact in the contact group to the contact number "425-555-1616" and the name "Alice." At block 480, the service management system 110 sends a modification request to the billing system 130. Those skilled in the art will appreciate that the billing system maintains its own database 170 of subscribers and subscriber contact groups so that it may appropriately bill the subscriber for services used under that service plan. It is beneficial to update the billing system in substantially real-time as doing so enables ongoing reconciliation between the networks of different service providers. At a block 485, the service management system 110 waits to receive confirmation from the billing system that the modification has been made. When such confirmation is received, at a block 490, the service management system sends a command to the service client 180 directing the service client to implement the modification request. At a block 495, the service management system sends a message to the subscriber confirming that the modification request has been completed. Once the modification request has been acted on, processing of the request is complete.

Returning to FIG. 3, in addition to managing the proposed modification to the service plan by a subscriber, the service management system 110 may also manage other aspects of the activation, deactivation, and maintenance of a subscriber. As was previously mentioned, the service management system 110 may send an "on" command to the service client 180 to activate the client in anticipation of providing service. In addition to the "on" command, the service management system 110 may also send an "off" command to the service client 180 to deactivate the client. Deactivation may occur at the request of the subscriber, such as when the subscriber cancels a service, or may occur at the direction of the service provider when the subscriber fails to pay for a service or otherwise violates the terms of use of a service. The service management system 110 may also implement a "sync" command that is received from the service client 180. The sync command causes the service management system to copy the relevant contents from the subscriber's record 310 in the subscriber database 215 to the service plan table 195 maintained by the service client 180. The sync command may be used when a subscriber switches to a new mobile device or otherwise needs to update the contents of the entire contact group.

The service management system 110 also includes a number of components that allow the service provider to manage the system and allow the management system to communicate with the other portions of the telecommunication system. The service management system 110 includes interfaces 230, an alarm management and rollover control component 240, a reporting and analytics component 250, and an operating system component 260. The interfaces 230 are provided to allow the service management system 110 to communicate with other systems in the telecommunication system 100, such as the billing system 130 and the communication network 140. The interfaces may operate using a variety of standard protocols or defined APIs, such as SOAP or XML for communication with the billing system.

The alarm management and rollover control component 240 is included in the service management system 110 to maintain the overall reliability of the service management system. It will be appreciated that because modifications to subscriber service plans are intended to occur in a manner that is substantially in real-time, the service management system 110 is preferably a highly reliable service. In order to reach this goal, various technological solutions may be implemented. For example, the service management system may operate on a number of geographically-dispersed servers that are configured to be redundant. In the event that one of the servers fails, the other servers may take over the load without interruption of service. Alternatively, a standby server may be maintained that can be hot-swapped into the system in the event that a primary server fails. Those skilled in the art will appreciate that other solutions to maintain high reliability may be implemented by the alarm management and rollover control component 240.

The reporting and analytics component 250 allows the service provider that operates the service management system 110 to compile and review a number of reports that detail the health and operation of the system and the service plan. For example, when the service plan is a group-centric plan, the reporting and analytics component may produce reports such as the average number of subscribers, the average number of group modifications segmented in certain time periods (e.g., daily, weekly, monthly, yearly), the average number of group modifications rejected by the system, etc. Reports generated by the reporting and analytics component 250 allow the service provider to appropriately provision resources for the service management system, tailor the service plan based on the actual use of the subscriber base, and in general review system operation to ensure a high degree of subscriber satisfaction.

The operating system component 260 is one or more operating systems that create the environment for the operation of the software applications and database within the service management system. Those skilled in the art will appreciate that other standard components may be included in the service management system 110 in order to achieve the functionality described herein.

It will be appreciated that the system configuration disclosed herein significantly improves subscriber experience. Subscribers are able to modify aspects of his or her service plan in a variety of ways, and the modifications are quickly propagated throughout the telecommunication system so that the subscriber begins operating under the modified plan in a very short period (often in a few minutes or less). Billing integrity is maintained as changes are made to the billing system soon after the subscriber makes the modification request.

While various embodiments are described in terms of the environment described above, those skilled in the art will appreciate that various modifications can be made to the system without impacting the overall functionality. For example, while a service client 180 is maintained on the mobile device to ensure that the subscriber may view his or her group contacts even when not in range of a service network, a system could be envisioned that would only maintain the group contacts at a central server. A subscriber would access the central server to make modifications as described herein.

It will also be appreciated that the system may be implemented in a variety of environments. For example, the system could be implemented using a single monolithic computer system, a distributed system, or various other combination of computer systems or similar devices connected in a variety of ways. The system could be implemented using third-party services and data for all or portions of the aforementioned functionality. Moreover, as used herein, the term "database" should be interpreted to include any data structure that allows data to be stored and accessed, such as tables, linked lists, flat files, arrays, etc. Those skilled in the art will also appreciate that the steps shown in FIGS. 5A and 5B may be altered in a variety of ways. For example, the order of the steps may be rearranged, substeps may be performed in parallel, steps may be omitted, or other steps may be included.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of propagating subscriber-driven changes to a service plan over a network, the method enabling a subscriber to modify a group of contacts so that communications with members in the group of contacts receive a different treatment than communications with members that are not in the group of contacts, the method comprising:
   (a) maintaining, by a service management system arranged in communication with one or more mobile devices and a billing computer system, a local record of a group of contacts associated with an activated service plan within a subscriber database of the service management system;
   (b) receiving, from a subscriber mobile device of the one or more mobile devices, a request to modify a composition of the group of contacts, wherein the request comprises an unsolicited request from the subscriber to modify one of the contacts in the group of contacts, wherein the group of contacts is associated with the activated service plan for the subscriber mobile device, wherein:
      (i) the activated service plan is associated with one or more rules defined by a service provider,
      (ii) the subscriber mobile device maintains, on the subscriber mobile device, a record of subscriber-modifiable elements of the activated service plan, the record including a service plan table comprising a group of contacts, the group of contacts defined by the subscriber, each contact of the group of contacts identified by a contact number and a position number of a respective contact, wherein the activated service plan is associated with the mobile device, and,
      (iii) the unsolicited request to modify the one of the contacts in the group of contacts includes at least a modification of the position number for the one of the group of contacts;
   (c) in response to receiving the unsolicited request from the subscriber mobile device, verifying, by the service management system, that the unsolicited request comprises a valid modification request for the activated service plan in accordance with the one or more rules defined by the service provider; and
   (d) responsive to determining that the received unsolicited request comprises a valid modification request, updating, by the service management system, the local record within the subscriber database in accordance with the request to modify the composition of the group of contacts, the updating causing a treatment associated with the one of the group of contacts to be modified;
   (e) generating, by the service management, an update request to modify how the subscriber is billed based on the valid modification request and communicating the update request to the billing computer system, wherein the update request causes the billing computer system to update a database of the billing computer system in accordance with the request to modify the composition of the group of contacts;
   (f) receiving, by the service management system from the billing computer system, a billing modification confirmation, the billing modification confirmation indicating that the update request has been completed;
   (g) executing, by the service management system, a sync command received from a service client of the subscriber mobile device, the execution of the sync command causing the service management system to update the record of subscriber-modifiable elements maintained on the subscriber mobile device in accordance with the request to modify the composition of the group of contacts by exporting contents of the updated local record within the subscriber database to the service plan table, wherein the updated record of subscriber-modifiable elements is configured to cause the mobile device to display an updated position number for the one of the group of contacts;
   wherein the verification, the updating of the local record within the subscriber database, the communication of the update request to the billing computer system, and the sync command are performed automatically by the service management system responsive to the unsolicited request without human intervention in real-time.

2. The method of claim 1, wherein the unsolicited request is received via an SMS message.

3. The method of claim 1, wherein the unsolicited request is received via a WAP page.

4. The method of claim 1, wherein the unsolicited request is received via a web page.

5. The method of claim 1, wherein the treatment is a billing rate.

6. The method of claim 1, wherein the treatment is a feature.

7. The method of claim 1, wherein the treatment is preferential service.

8. The method of claim 1, wherein the one or more predefined rules sets a limit on the number of modifications that can be made to the group of contacts within a time period.

9. The method of claim 1, wherein the one or more predefined rules sets a limit on the number of modifications that can be made to one of the group of contacts within a time period.

10. The method of claim 1, wherein the one or more predefined rules sets a limit on the number of modifications that can be made to a subset of the group of contacts within a time period.

11. The method of claim 1, wherein the verifying further comprises verifying that the received request provides accurate information.

12. The method of claim 1, further comprising communicating to a subscriber that the modification request has been completed after the modification to the treatment has been performed.

13. The method of claim 1, further comprising communicating to the subscriber that the modification request has been completed.

14. The method of claim 1, wherein the group of contacts is applicable to a plurality of mobile devices.

15. A service management system arranged in communication with one or more mobile devices and a billing computer system, the service management system configured to propagate subscriber-driven changes to a service plan over a network by enabling a subscriber to modify a group of contacts so that communications with members in the group of contacts receive a different treatment than communications with members that are not in the group of contacts, the service management system comprising:
   at least one computing system, an operating system, and a subscriber database, the at least one computing system of the service management system configured to:
   (a) maintain, within a subscriber database of the service management system, a local record of a group of contacts associated with an activated service plan;
   (b) communicate with a mobile device of the subscriber, the mobile device comprising a service client configured to:
   (i) interface with the service management system, and,
   (ii) maintain, on the mobile device, a record of subscriber-modifiable elements of the activated service plan, the record including a service plan table comprising a group of contacts, the group of contacts defined by the subscriber, each contact of the group of contacts identified by a contact number and a position number of a respective contact, wherein the activated service plan is associated with the mobile device;
   (c) receive, from the mobile device, a request to modify a composition of the group of contacts, wherein the request comprises an unsolicited request from the subscriber to modify one of the contacts in the group of contacts, wherein the group of contacts is associated with an activated service plan for the mobile device, wherein the unsolicited request to modify the one of the contacts in the group of contacts includes at least a modification of the position number for the one of the group of contacts, and wherein the activated service plan is associated with one or more rules defined by a service provider;
   in response to receiving the unsolicited request, verify that the unsolicited request comprises a valid modification request for the activated service plan in accordance with the one or more rules defined by the service provider; and
   in response to determining that the received unsolicited request comprises a valid modification request, updating the local record within the subscriber database in accordance with the request to modify the composition of the group of contacts, the updating causing a treatment associated with the one of the group of contacts to be modified;
   generate an update request to a billing computer system to modify how the subscriber is billed based on the valid modification request and communicate the update request to the billing computer system, wherein the update request causes the billing computer system to update a database of the billing computer system;
   receive, from the billing computer system, a billing modification confirmation, the billing modification confirmation indicating that the update request has been completed;
   executing a sync command received from the service client of the mobile device, the execution of the sync command causing the service management system to update the record of subscriber-modifiable elements maintained on the mobile device in accordance with the request to modify the composition of the group of contacts by exporting contents of the updated local record within the subscriber database to the service plan table, wherein the updated record of subscriber-modifiable elements is configured to cause the mobile device to display an updated position number for the one of the group of contacts;
   wherein the verification, the updating of the local record within the subscriber database, the communication of the update request to the billing computer system, and the sync command are performed automatically by the service management system responsive to the unsolicited request without human intervention in real-time.

16. The system of claim 15, wherein the unsolicited request is received via an SMS message.

17. The system of claim 15, wherein the unsolicited request is received via a WAP page.

18. The system of claim 15, wherein the unsolicited request is received via a web page.

19. The system of claim 15, wherein the treatment is a billing rate.

20. The system of claim 15, wherein the treatment is a feature.

21. The system of claim 15, wherein the treatment is a preferred service.

22. The system of claim 15, wherein the one or more predefined rules sets a limit on the number of modifications that can be made to the group of contacts within a time period.

23. The system of claim 15, wherein the one or more predefined rules sets a limit on the number of modifications that can be made to one of the group of contacts within a time period.

24. The system of claim 15, wherein the one or more predefined rules sets a limit on the number of modifications that can be made to a subset of the group of contacts within a time period.

25. The system of claim 15, wherein the verification further comprises verifying that the received request provides accurate information.

26. The system of claim 15, wherein the service management component further modifies a service plan associated with the one of the group of contacts.

27. The system of claim 15, where the service management system is further configured to communicate to the subscriber that the modification request has been completed.

28. The system of claim 15, wherein the group of contacts is applicable to a plurality of mobile devices.

29. A non-transitory computer readable medium comprising computer executable instructions that are configured to cause performance of a method for propagating subscriber-driven changes to a service plan over a network, the method enabling a subscriber to modify a group of contacts so that communications with members in the group of contacts receive a different treatment than communications with members that are not in the group of contacts, the instructions configured to cause performance of the operations comprising:
- (a) maintaining, by a service management system arranged in communication with one or more mobile devices and a billing computer system, a local record of a group of contacts associated with an activated service plan within a subscriber database of the service management system;
- (b) receiving, from a subscriber mobile device of the one or more mobile devices, a request to modify a composition of the group of contacts, wherein the request comprises an unsolicited request from the subscriber to modify one of the contacts in the group of contacts, wherein the group of contacts is associated with the activated service plan for the subscriber mobile device, the unsolicited request to modify the one of the contacts in the group of contacts including at least a modification of the position number for the one of the group of contacts, wherein:
  - (i) the activated service plan is associated with one or more rules defined by a service provider, and,
  - (ii) the subscriber mobile device maintains, on the subscriber mobile device, a record of subscriber-modifiable elements of the activated service plan, the record including a service plan table comprising a group of contacts, the group of contacts defined by the subscriber, each contact of the group of contacts identified by a contact number and a position number of a respective contact, wherein the activated service plan is associated with the mobile device;
- (c) in response to receiving the unsolicited request from the subscriber mobile device, verifying, by the service management system, that the unsolicited request comprises a valid modification request for the activated service plan in accordance with the one or more rules defined by the service provider; and
- (d) responsive to determining that the received unsolicited request comprises a valid modification request, updating, by the service management system, the local record within the subscriber database in accordance with the request to modify the composition of the group of contacts, the updating causing a treatment associated with the one of the group of contacts to be modified;
- (e) generating, by the service management, an update request to modify how the subscriber is billed based on the valid modification request and communicating the update request to the billing computer system, wherein the update request causes the billing computer system to update a database of the billing computer system in accordance with the request to modify the composition of the group of contacts;
- (f) receiving, by the service management system from the billing computer system, a billing modification confirmation, the billing modification confirmation indicating that the update request has been completed;
- (g) executing, by the service management system, a sync command received from a service client of the subscriber mobile device, the sync command causing the record of subscriber-modifiable elements maintained on the subscriber mobile device to be updated in accordance with the request to modify the composition of the group of contacts by importing contents of the updated local record within the subscriber database to the service plan table, wherein the updated record of subscriber- modifiable elements is configured to cause the mobile device to display an updated position number for the one of the group of contacts;

wherein the verification, the updating of the local record within the subscriber database, the communication of the update request to the billing computer system, and the sync command are performed automatically by the service management system responsive to the unsolicited request without human intervention in real-time.

30. The non-transitory computer readable storage medium of claim 29 further comprising instructions that enable specification of a contact name associated with the one contact of the group of contacts.

31. The non-transitory computer readable storage medium of claim 29, further comprising instructions that enables specification of a list position of the one contact in the group of contacts.

* * * * *